R. L. CRISWELL.
SPLIT CONNECTING LINK.
APPLICATION FILED MAR. 10, 1914.
1,151,246. Patented Aug. 24, 1915.
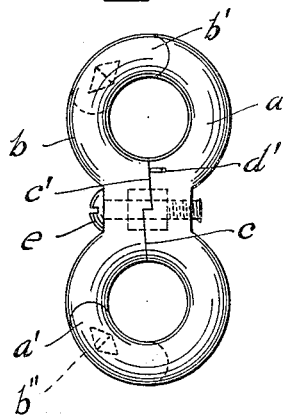
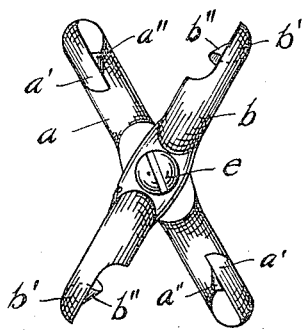
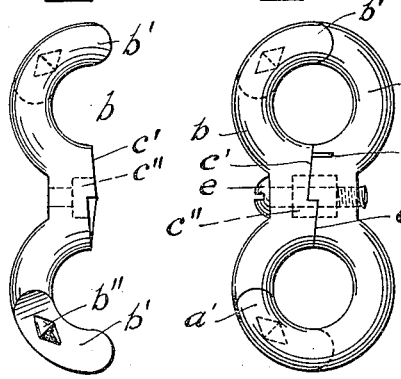
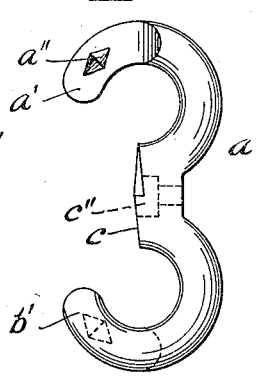
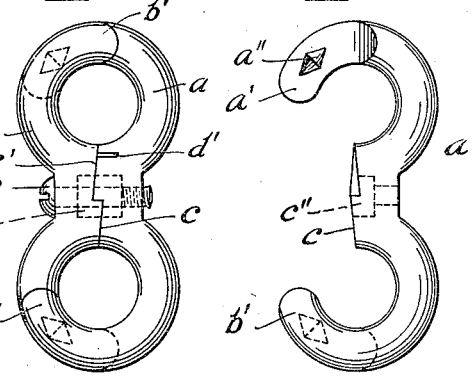
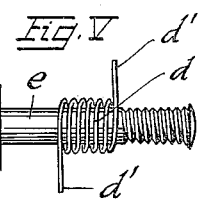
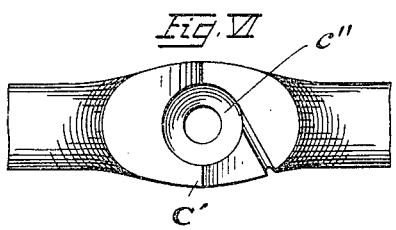
Witnesses:
F. C. Valentine
J. R. Curtis.
Inventor:
Richard L. Criswell,
his attorney.

UNITED STATES PATENT OFFICE.

RICHARD L. CRISWELL, OF CLEVELAND, OHIO.

SPLIT CONNECTING-LINK.

1,151,246.  Specification of Letters Patent.  Patented Aug. 24, 1915.

Application filed March 10, 1914. Serial No. 823,824.

*To all whom it may concern:*

Be it known that I, RICHARD L. CRISWELL, a citizen of the United States, residing at Cleveland, in the county of Cuyahoga and State of Ohio, have invented certain new and useful Improvements in Split Connecting-Links, of which the following is a specification.

My invention relates to improvements in split connecting links of the centrally pivoted type, and has for its object the provision of compact means for normally maintaining the link in its closed or locking position, and for permitting it to be attached and detached with the minimum slack in the connected chain-sections.

The features of my improvement relate primarily to the type of connecting link which is adapted for uniting lengths or sections of chain normally drawn taut and slacked at intervals, so that the ordinary type of connecting link is not infrequently relaxed, and the ends of the chain-sections are permitted to separate. Moreover, a connecting link of ordinary type, which has relatively long over-lapping members, actually requires a considerable slack in the connected chain, for the purpose of hooking or unhooking the terminal link of said chain from the connecting link.

In the construction herein shown and described, the pivotal type of connecting link has been modified to overcome the objections noted, and is better adapted to meet the practical requirements of such a device. The two pivotal members are constructed so that they are not symmetrical, and overlap at their shorter ends, but slightly beyond their longitudinal axis, thus permitting the terminal link of the chain to be attached and detached much more readily than with the ordinary type of connecting link. Again, the pivotal portion of said link is somewhat decreased in diameter, preferably in the plane of the links, so that it affords practically no obstruction in passing through openings or protruding beyond parts with which the chain is associated. This central member also is slightly recessesd to accommodate a closely coiled spring normally reacting against the two members to keep them in their closed position, while the connecting pivot-pin is provided with a screw thread slightly upset at its protruding end, and this screw is adapted to maintain the link-members substantially in locked relation, by reason of two inner cam-faces, provided upon the connecting member. The details of these improvements may best be explained by making reference to the accompanying drawings, wherein:—

Figure I is a view in side elevation of my improved device. Fig. II is an edgewise view thereof with the members opened or separated. Figs. III and IV are views in elevation of the two asymmetrical members forming my improved connecting link. Fig. V is a detail of the screw and spring. Fig. VI is an enlarged detail showing the cam faces and recessed hub, and Fig. VII is a view in elevation showing a modified construction of the cam faces.

Throughout the several figures of the drawings, I have employed the same character of reference to indicate similar parts.

The typical connecting link upon which I have improved, comprises two symmetrical members pivotally united to swing centrally through approximately 90 degrees, and whose split terminal members are constructed to over-lap throughout approximately 270 degrees of the circle. A spiral spring is positioned in the widened pivotal hub, and normally tends to close the two link members upon each other, such as are shown in the patents to Benson, No. 286,253, and to Barnes, No. 324,637.

Referring to the drawings, it will be seen that the members $a$, $b$, of my improved device, are not symmetrical; the former having split or sectional semi-circular retaining parts $a'$, extending slightly beyond the longitudinal axis of the device. The co-acting members $b'$ are similarly split and shaped to accommodate the members $a'$ when closed thereon, but these extend approximately throughout 270 degrees of the circle. It will be appreciated that the connected chain may be much more readily released from the shorter members $a'$ and with less slack of said chain, than when the split members over-lap throughout a greater portion of the circle. However, as the members $a'$ extend past the longitudinal axis of the device, they normally bear their full proportion of the strain exerted upon the said link. It will be observed that co-acting entering lugs and recesses $a''$, $b''$, are interiorly formed upon the split members of the link, so that these parts are thereby stayed against any separating strain when they are in their closed position.

Two cam-faces $c$, $c'$, are respectively provided upon the connecting portion or hub of the device, wherein a central recess $c''$ is formed to accommodate a short length of closely coiled spring $d$, having its ends $d'$ extending into slots or saw-cuts respectively provided therefor, adjacent to the hub in both of the members.

A screw $e$ is threaded into one of the members, and its terminal thread is slightly upset at the protruding end, so that when the screw is tightly set, the cam-faces $c$, $c'$ are held closely in engagement and will not permit the link to be opened, but positively lock it in its closed position. By relaxing the screw, however, the link may be opened against the tension of spring $d$, which normally maintains the link in its closed position, and prevents the release of the connected chain sections or other united members.

Figs. I and VII respectively show two different arrangements of the cam faces, wherein the said cams, serving as locking parts, are oppositely disposed, either to secure a positive or a wedging lock for the two pivotal link members, when the screw is tightly set. In one type, the screw must be sufficiently relaxed to permit the separation of the engaging shoulders, while in the other, a partial release by the screw will permit the sections to be opened accordingly, against the tension of the spring. In separating or entering the terminal links of a chain, it will be seen that less slack is required to disengage or engage the same with the use of the shorter link members, than with a device having long, over-lapping terminals.

Having now described the preferred embodiment of my invention, I hereby make claim to, and desire to secure by Letters Patent, the following:—

1. A split link comprising two sections respectively having terminal loops semi-circular and greater than semi-circular in contour, fitting over each other, a central connecting member, and a pivot uniting said members, substantially as set forth.

2. A split link comprising two sections asymmetrical upon their longitudinal axis; one having shorter over-lapping terminals as compared with the other, central connecting-members and a pivot uniting the same to permit the sections to swing laterally upon each other, substantially as set forth.

3. A split connecting link comprising two sections having a central bearing, cam faces thereon, a locking pivot uniting the bearing, and partially over-lapping link members formed at both ends of the two sections, substantially as set forth.

4. A connecting link comprising two over-lapping sections each having a recessed central connecting member enlarged in the plane of the link's greatest diameter, a pivot uniting the same, and a closely coiled spring positioned within the recesses and reacting upon both sections to maintain them in engagement, substantially as set forth.

5. A split connecting link comprising two sections each having a central bearing, locking parts thereon, a pivot member uniting the bearing and adapted to draw the locking parts into engagement, and partially over-lapping link members formed at both ends of said sections, substantially as set forth.

In testimony whereof I do now affix my signature in the presence of two witnesses.

RICHARD L. CRISWELL.

Witnesses:
R. C. CRISWELL,
ALBERT LYNN LAWRENCE.

Copies of this patent may be obtained for five cents each, by addressing the "Commissioner of Patents, Washington, D. C."